(No Model.) 3 Sheets—Sheet 1.

T. F. ROWLAND.
MACHINERY FOR CHARGING RETORTS.

No. 322,128. Patented July 14, 1885.

Witnesses:—
Robt. F. Gaylord,
Robt. H. Duncan.

Inventor:—
Thomas F. Rowland,
by Saml. A. Duncan, Atty.

(No Model.)   T. F. ROWLAND.   3 Sheets—Sheet 2.
MACHINERY FOR CHARGING RETORTS.
No. 322,128.   Patented July 14, 1885.
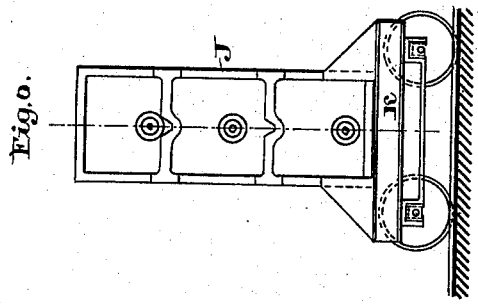
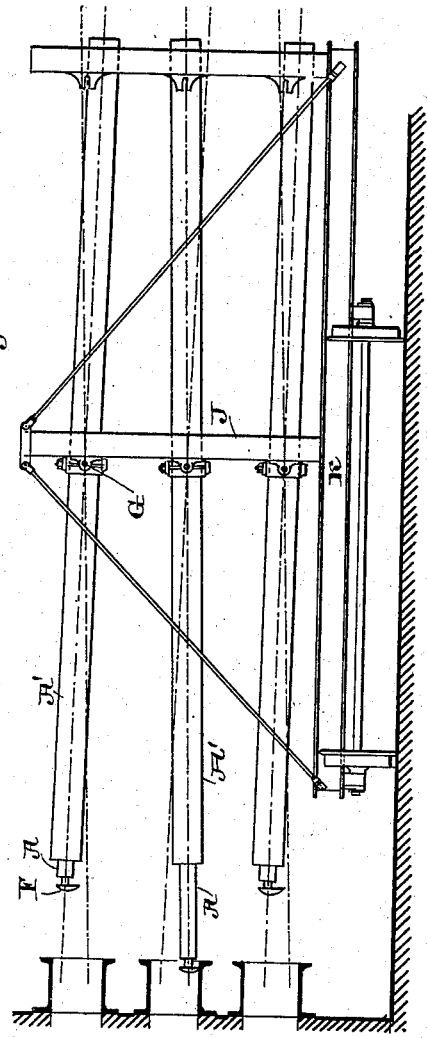
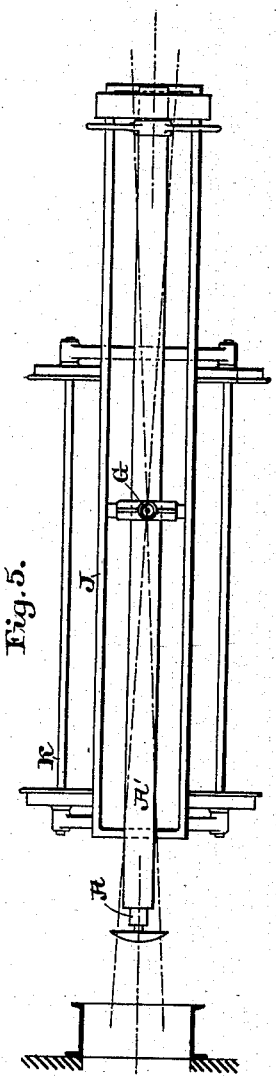
Witnesses:—
Robt. F. Gaylord,
Robt. H. Duncan
Inventor:—
Thomas F. Rowland,
by Saml. A. Duncan, Atty (No Model.) 3 Sheets—Sheet 3.
T. F. ROWLAND.
MACHINERY FOR CHARGING RETORTS.
No. 322,128. Patented July 14, 1885.
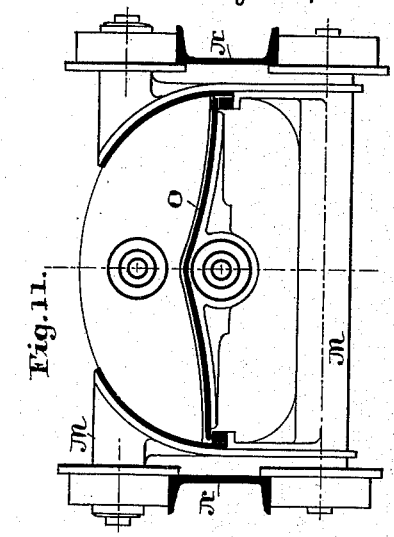
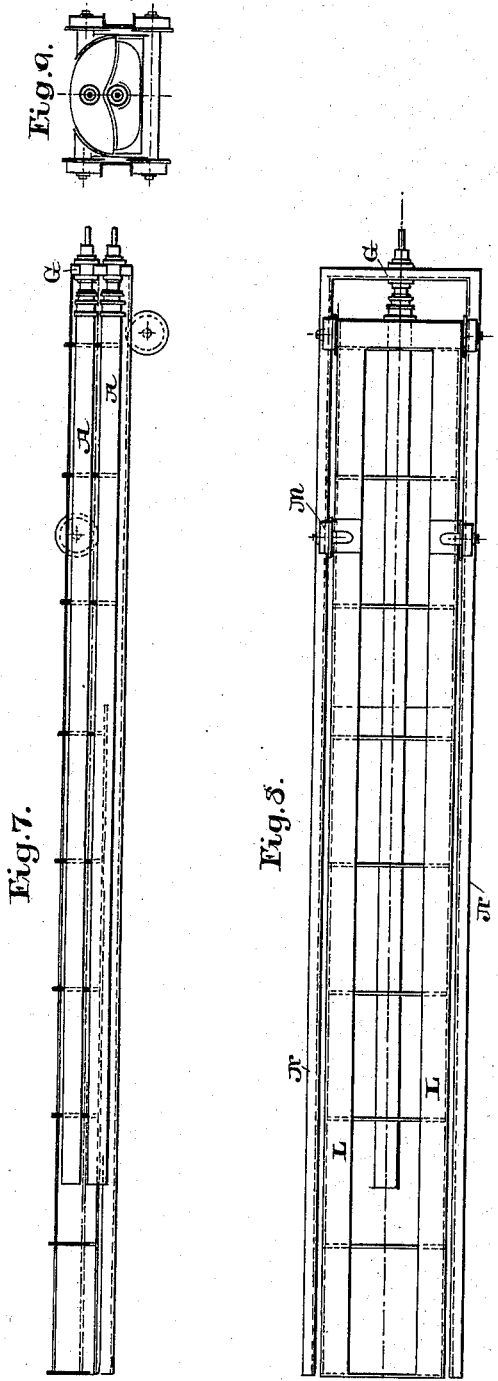
Witnesses:—
Robt. F. Gaylord,
Robt. H. Duncan
Inventor:—
Thomas F. Rowland,
by Sam'l A. Duncan Att'y

UNITED STATES PATENT OFFICE.

THOMAS F. ROWLAND, OF NEW YORK, N. Y.

MACHINERY FOR CHARGING RETORTS.

SPECIFICATION forming part of Letters Patent No. 322,128, dated July 14, 1885.

Application filed July 26, 1884. (No model.)

*To all whom it may concern:*

Be it known that I, THOMAS F. ROWLAND, of the city, county, and State of New York, have invented certain new and useful Improvements in Machines for Charging Retorts, of which the following is a full, clear, and exact description, such as will enable those skilled in the art to make and use the same.

The invention relates to those machines for charging and drawing retorts in which the charging devices are projected into and withdrawn from the retorts by the action of hydraulic machinery; and the invention consists in a new and improved arrangement of the hydraulic cylinders, which respectively project and withdraw the scoop and discharge the same, whereby the machinery for and the operation of charging the retorts is simplified and made more positive.

Figure 1:
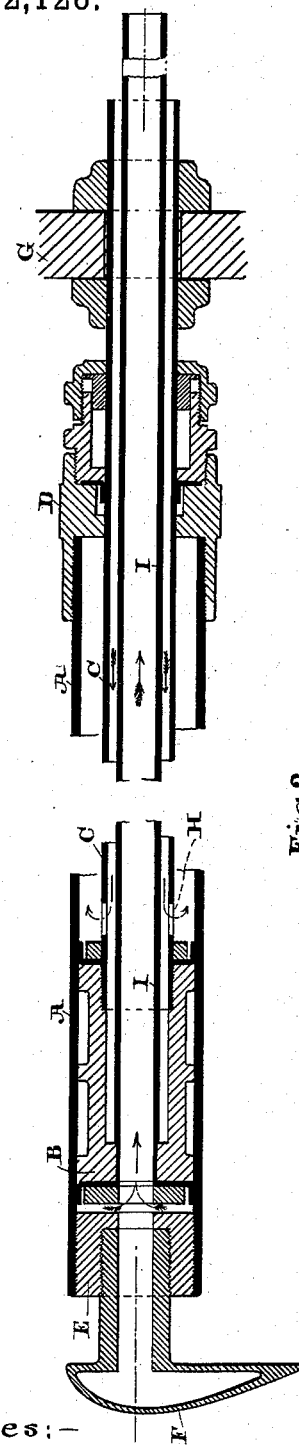
Figure 2:
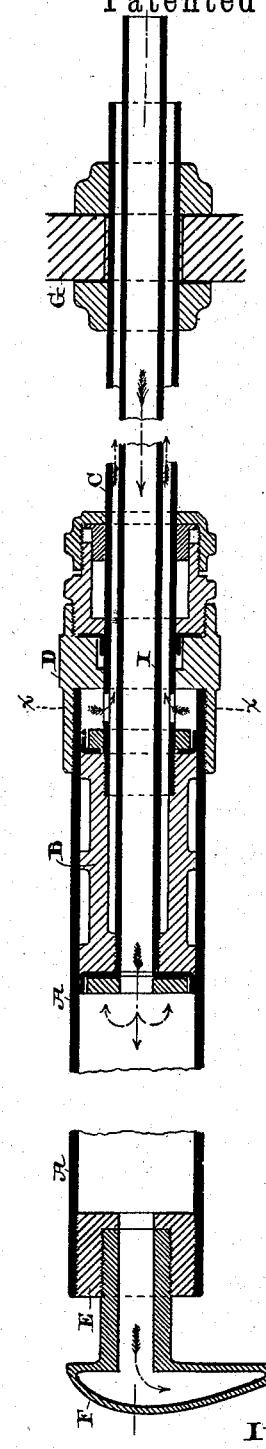
Figure 3:

Referring to the drawings accompanying this description, Figure 1 is a central longitudinal section of the hydraulic apparatus that I employ, the parts being shown in the withdrawn positions or their position when closed together. Fig. 2 is a like view of the same parts in the advanced position. Fig. 3 is a cross-section of the same on plane $x\ x$. Figs. 4, 5, and 6 are respectively elevation, plan, and end views of a carrier for supporting the hydraulic apparatus of the first two figures when it is used to operate a rake or withdrawing device. Figs. 7, 8, and 9 are central sectional, plan, and end views of a carrier for supporting a scoop or charging device, and said hydraulic apparatus as arranged when used to operate said scoop; and Figs. 10 and 11 are respectively enlarged detail end views of the scoop and of the scoop and its carrier.

Referring to the first sheet of drawings, A represents the hydraulic cylinder, B the piston, and C the piston-rod. The cylinder is provided at its inner end with a head, D, which is pierced by the piston-rod, and has suitable packing devices for forming a close joint therewith. The outer end of the cylinder is closed by a head, E, by which attachment is made with the device that the apparatus is to operate, such device being in these views the rake F. The piston is fast to the hollow piston-rod, and is provided with suitable means for packing it on the inner surface of the cylinder; and the piston-rod is provided with ports H, through which it communicates with the inner end of the cylinder, and it is secured to the fixed support G. Within the piston-rod is the supply-pipe I, which is fast to and extends through the piston, so as to communicate with the outer end of the cylinder. The outer ends of the piston and inner supply-pipe are properly closed and connected with some source of water-pressure, such as a pump and accumulator or a pump and boiler, which usually are carried on the same truck with the scoop. There is also suitable valve mechanism for connecting, at the will of the operator, either the piston-rod or the supply-pipe with the source of water-power, it being understood that when either is connected with the machine storing the water under pressure the other is disconnected therefrom or is in a condition to exhaust, this usually being accomplished by means of a slide-valve mechanism with two ports and one exhaust.

The operation of the mechanism will now be plain: Water is admitted to the outer end of the cylinder through the inner supply-pipe and causes the cylinder to move along and over the piston and its rod until the head of the inner end of the cylinder has been brought nearly into contact with the piston, as seen in Fig. 2. Then the supply-pipe is connected with the exhaust, and the water under pressure is admitted to the hollow piston-rod, through the ports of which it enters to the inner end of the cylinder and causes it to be drawn back over the piston to its first position.

The views of Sheet 3 illustrate the application of this hydraulic apparatus to a scoop for charging the retorts. Here there are shown two cylinders, A A, and their pistons. The upper cylinder is attached to the scoop L, the inner end of which is supported on the truck M, running on track N, while its outer end is free to slide into the retorts. The lower cylinder is secured to the sliding bottom O of the scoop, and both cylinders are fixed, at G, to the general frame supporting the trucks. This whole mechanism is carried upon a truck, which travels in front of the retorts and carries the water pump or ram for actuating the hydraulic cylinders, as also means for raising the scoop-truck to the different heights of the retorts and a supply of coal for charging the scoop.

A truck adapted to carrying the rakes is shown by the views of the second sheet of drawings, the hydraulic cylinders, however, being here centrally fastened to the carrier-frame J by universal joints G, which permit the rakes to have a lateral movement to pass over the coke during the instroke and to dip into or behind the coke before they commence the outstroke, and these trucks are moved from place to place along the whole system of retorts on rails properly arranged in front of the retorts. When a retort is to be charged and the loaded scoop has been brought into proper position in front thereof, the two hydraulic cylinders are caused to project the scoop into the retort. The lower cylinder then takes its return-stroke and thereby withdraws the sliding bottom of the scoop and deposits the coal in the retort. The upper cylinder then takes its back-stroke and withdraws the empty scoop, which, in returning, slides over the withdrawn bottom, so that when the scoop is at the end of its back movement it is closed and ready to be recharged.

It will be plain to those skilled in the art that other means may be used for connecting the ends of the cylinder with the source of power than by the hollow piston and contained supply-pipe and yet use the cylinder and piston as here described; and I do not, therefore, limit myself to such hollow piston and pipe for such purpose. So, also, instead of using water as the agent for operating the apparatus, compressed air might be used, or steam, or other suitable fluid or gas.

I am aware that hydraulic machinery, consisting of three or more telescoping-cylinders, has been used for operating a gas-retort scoop, and that these cylinders have been arranged with the largest or outer one directly attached to the scoop; but this arrangement I do not claim.

What I claim as new is—

1. In combination, in a retort-charging machine, a scoop provided with a sliding bottom, a hydraulic apparatus for projecting and withdrawing the scoop, consisting of a cylinder attached to the scoop and moving on a fixed piston, and a like hydraulic apparatus for projecting and withdrawing the bottom of the scoop, substantially as set forth.

2. In combination, the scoop L, provided with the sliding bottom O, and mounted upon a truck, N, the cylinder and piston A for operating the scoop, and the cylinder and piston A for operating the bottom O, said pistons being fixed to the frame of the machine, and said cylinders being attached to the movable parts that they operate, substantially as set forth.

In witness whereof I have hereunto subscribed my name in presence of two witnesses.

THOS. F. ROWLAND.

Witnesses:
 WARREN E. HILL,
 JOHN BALMORE.